(12) United States Patent
Themont et al.

(10) Patent No.: US 6,321,571 B1
(45) Date of Patent: Nov. 27, 2001

(54) METHOD OF MAKING GLASS STRUCTURES FOR FLAT PANEL DISPLAYS

(75) Inventors: Jean-Pierre Themont; Jean-Jacques B. Theron, both of Montigny-sur-Loing (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/458,913

(22) Filed: Dec. 10, 1999

Related U.S. Application Data
(60) Provisional application No. 60/117,158, filed on Jan. 25, 1999.

(30) Foreign Application Priority Data

Dec. 21, 1998 (EP) .................................................. 98403245

(51) Int. Cl.$^7$ ................................................ C03B 23/207
(52) U.S. Cl. ................ 65/155; 65/17.3; 65/63; 349/155; 349/156; 156/89.12; 156/230; 156/231; 156/233; 156/247; 156/240; 427/163.1; 427/163.3; 427/383.5; 427/428
(58) Field of Search .............................. 65/17.3, 63, 155; 349/155, 156; 156/89.12, 230, 231, 233, 247, 240; 427/163.1, 163.3, 383.5, 428

(56) References Cited

U.S. PATENT DOCUMENTS

| | | | |
|---|---|---|---|
| 2,303,395 | * 12/1942 | Schultz et al. | ............ 156/231 |
| 4,853,590 | 8/1989 | Andreadakis . | |
| 4,896,149 | 1/1990 | Buzak et al. . | |
| 5,036,317 | 7/1991 | Buzak . | |
| 5,077,553 | 12/1991 | Buzak . | |
| 5,272,472 | 12/1993 | Buzak . | |
| 5,313,223 | 5/1994 | Buzak . | |
| 5,412,867 | * 5/1995 | Aikawa et al. | ............ 156/230 |
| 5,540,147 | * 7/1996 | Johnson | ............ 156/240 |
| 5,544,582 | * 8/1996 | Bocko et al. | ............ 156/240 |
| 5,609,704 | * 3/1997 | Hayama et al. | ............ 156/230 |
| 5,624,775 | * 4/1997 | Carre et al. | ............ 156/240 |
| 5,678,483 | * 10/1997 | Johnson | ............ 156/240 |
| 5,846,366 | * 12/1998 | Jin et al. | ............ 156/233 |
| 5,853,446 | * 12/1998 | Carre et al. | ............ 65/17.3 |
| 6,251,208 | * 6/2001 | Serizawa et al. | ............ 65/17.3 |

FOREIGN PATENT DOCUMENTS

| | | |
|---|---|---|
| 4-075232 | 3/1992 | (JP) . |
| 4-255638 | 9/1992 | (JP) . |

\* cited by examiner

*Primary Examiner*—Michael Colaianni
(74) *Attorney, Agent, or Firm*—Maurice M. Klee; Angela N. Nwaneri

(57) ABSTRACT

An assembly of rib structures sandwiched between a dielectric glass layer and a glass substrate for use in a flat panel display, such as plasma addressed liquid crystal (PALC) displays, is formed by a number of methods. One method includes molding thermoplastic glass frit containing paste into rib structures, transferring the rib structures to a thin transparent layer of a thermoplastic dielectric glass frit containing composition on a drum, and transferring the rib structures with the thin transparent dielectric glass layer to a glass substrate having metallic electrodes already formed thereon.

13 Claims, 6 Drawing Sheets

METHOD OF MAKING GLASS STRUCTURES FOR FLAT PANEL DISPLAYS

CROSS-REFERENCE TO RELATED APPLICATIONS

This application discloses subject matter related to co-pending applications "OPAQUE RIB STRUCTURES FOR DISPLAY PANEL" filed on Dec. 21, 1998, as European Patent Application No. 98403244.1 and on Jan. 25, 1999 as U.S. application Ser. No. 60/117,158; and U.S. application Ser. No. 08/820,206 filed Mar. 18, 1997 now U.S. Pat. No. 5,853,446; the disclosures of which are incorporated herein by reference.

FIELD OF THE INVENTION

The invention relates to the field of flat panel displays, and in particular, to a method of manufacturing plasma addressed liquid crystal (PALC) displays.

BACKGROUND INFORMATION

Flat panel displays, e.g., liquid crystal displays, are known. Recently, the use of plasma channels to address a liquid crystal display (LCD) has become known. For example, U.S. Pat. Nos. 4,896,149, 5,036,317, 5,077,553, 5,272,472, 5,313,223, the disclosures of which are all hereby incorporated by reference, each disclose such a structure. This type of display technology provides an active addressing matrix suitable for high-line-count displays, and is a competitive alternative to the known thin-film transistor (TFT) active matrix approach.

These plasma channel panels are also referred to herein as plasma addressed liquid crystal (PALC) displays. This type of plasma display panel is generally formed of two parallel substrates separated from each other to form a discharge space between the substrates, which contains a discharge gas, such as a mixture of helium, neon and xenon. The inner-facing surface of each of the substrates bears a pattern of spaced parallel electrodes, with the electrodes on one substrate being oriented, for example, in a direction orthogonal to the direction of the electrodes on the other substrate. The electrode bearing surfaces of the substrates are typically covered with a dielectric layer, and red, green and blue phosphors are separately located in discrete areas on the internal surface of the dielectric layer on one of the two substrates. The dielectric layers are generally lead-based glass frits fired between 500 and 600° C., depending on their formulation and the level of uniformity required. The displayed picture is produced by plasma discharges which are induced locally in the gas by applying a suitable voltage between the electrodes of one substrate and the electrodes of the other substrate. Ultraviolet light emitted locally by the gas discharge induces luminescence of the neighboring phosphors.

A PALC display relies on the highly non-linear electrical behavior of a relatively low pressure (e.g., 10 to 100 Torr) gas, e.g., He, confined in parallel channels. A cross section of a portion of a PALC display 100 is shown in FIG. 1. A pair of parallel electrodes 101A (anode) and 101C (cathode) is deposited in each channel 102 on a rear glass plate 101G, for example, forming the bottom of the channels, and a very thin dielectric sheet 103, e.g., a glass micro-sheet of about 50 μm thickness, forms the top of the channels 102. A liquid crystal layer 104 on top of the micro-sheet 103 is the optically active portion of the display 100. A cover sheet 105, e.g., a passive glass plate of about 1.1 mm, with transparent conducting electrodes, e.g., made from indium-tin oxide (ITO), running perpendicular to the plasma channels 102, lies on top of the liquid crystal 104. Conventional polarizers 106, color filters 107, and back lights 108, like those found in other conventional liquid crystal displays, are also commonly used, as illustrated.

When voltages are applied to the transparent electrodes, since there is no ground plane, the voltages are divided among the liquid crystal, the micro-sheet, the plasma channel, and any other insulators intervening between the transparent electrode and whatever becomes the virtual ground. As a practical matter, this means that if there is no plasma in the plasma channel, the voltage drop across the liquid crystal will be negligible, and the pixels defined by the crossings of the transparent electrodes and the plasma channels will not switch. If, however, a voltage difference sufficient to ionize the gas is first applied between the pair of electrodes in a plasma channel, a plasma forms in the plasma channel so that it becomes conducting, and constitutes a ground plane. As a result, for pixels atop this channel, the voltages will be divided between the liquid crystal and the micro-sheet only. This places a substantial voltage across the liquid crystal and causes the pixel to switch. Igniting a plasma in the channel causes the row above the channel to be selected. Because the gas in the channels is non-conducting until a well-defined threshold voltage between the electrode pair is reached, the rows are extremely well isolated from the column voltages unless selected. This high non-linearity allows large numbers of rows to be addressed without loss of contrast.

To avoid luminous cross-talk between neighboring regions and improve the contrast in such displays, opaque barrier ribs 110 are disposed on at least one of the substrates (typically the rear one) forming electrically insulated discharge cells. The barrier rib structure is typically periodic with a pitch of, for example, from 200 μm to 400 μm, depending on the panel resolution. These ribs are, for example, about 30–100 μm wide and 100–200 μm thick (i.e., high).

Alternatively, a closed cell design has been employed having square cells which are about 200–400 μm on each side. The "ribs" which form these square cells are about 30 μm to 70 μm wide and about 30 to 200 μm high. Plasma panels of this type are described, for example, in U.S. Pat. No. 4,853,590, as well as Japanese Patent Application Nos. J04255638 and J04075232. The networks of parallel barrier ribs mentioned above delimit columns of pixels which can be addressed independently. The two perpendicular networks of electrodes allow ionization of the gas at the selected pixels. The ultraviolet radiation emitted by the ionized gas causes the excitation of areas of phosphorescent products associated with said pixels according to the configuration of an image which is to be displayed.

The PALC display relies on the use of a thin micro-sheet to separate the plasma from the liquid crystal. This micro-sheet should be as thin as possible (e.g. 1.5–2 mils), with as high a dielectric constant as possible, to thereby minimize the voltage drop across it. Current display manufacturers utilize a single, monolithic piece of micro-sheet for this purpose, e.g., a D-263 micro-sheet of 30 to 50 μm thickness made by Schott. However, these large sheets of glass are difficult to manufacture, causing the availability of large, thin micro-sheet to be a potential limitation on the size of the PALC displays that can be made.

In the past, the barrier ribs have typically been made either by a silk-screening method, or by sandblasting from a deposited layer of frit. Thus, the channels between the barrier ribs have been made by etching into a glass substrate or by building up walls of glass on a substrate by deposition processes such as screen-printing. However, etching of the channels typically results in channels having rounded bottoms, while building up material to form walls generally results in non-vertical side walls. Both of these conditions adversely affect light transmission through the panel. In addition, the manufacture of rib structures with a high aspect ratio usually requires multiple process steps, including polishing the top of the ribs to match the flatness of the glass micro-sheet.

Accordingly, a need exists for a method which solves the above problems and overcomes the limitations of the known manufacturing processes of PALC displays. There is further a need for a method which achieves improved structures on the rear glass plate, including metallic electrodes and high aspect ratio opaque ribs, and which can obtain such a structure with a thin dielectric glass sheet.

SUMMARY OF THE INVENTION

This invention provides a method for making glass structures for flat panel displays. This invention further provides a method that solves the above mentioned problems so that improved structures and lower manufacturing costs are achieved.

Copending related U.S. application Ser. No. 08/820,206 referenced above, discloses a micro-molding process for the formation of barrier ribs. Incorporation of such micro-molding techniques into the manufacture of PALC structures, according to the process of the present invention, overcomes many of the disadvantages noted above and provides a simplified process for the manufacture of such structures.

According to an aspect of the invention, a method of manufacturing an assembly of rib structures between glass substrates for use in a plasma addressed liquid crystal display includes: (a) providing a mold having cavities; (b) providing a glass paste into the mold cavities to form the rib structures; (c) forming a thin layer of a transparent glass on a collector drum; (d) transferring the rib structures from the mold to the thin transparent glass layer on the collector drum; and (e) transferring the rib structures and thin transparent glass layer from the collector drum to a glass substrate.

According to an aspect of the invention, the mold is a soft intaglio mold made of a material exhibiting good release characteristics such as silicone. In another aspect of the invention, the mold is a thick perforated sheet made of a material exhibiting good release characteristics such as silicone. In a further aspect of the invention, the glass paste is a glass frit with a curable, settable or hardenable (hereinafter referred to collectively as "curable") organic binder.

According to another aspect of the invention, the glass substrate has metallic electrodes formed thereon by a photolithographic technique, a screen printing technique, a micro-molding technique, or other conventional method. In a further aspect of the invention, the thin transparent layer of glass comprises a layer of glass approximately 50 $\mu$m or less in thickness after firing. Another aspect of the invention involves transferring the rib structure from the mold to the thin transparent layer of glass on the collector drum by contact and cooling.

An additional aspect of the invention provides a method of manufacturing a plasma addressed liquid crystal display structure, including: (a) providing a glass substrate; (b) providing a first mold having cavities; (c) providing a metallic paste into the mold cavities to form electrode structures; (d) transferring the electrode structures to the glass substrate; (e) providing a second mold having cavities; (f) providing a glass paste into the second mold cavities to form rib structures; (g) forming a thin layer of transparent glass on a collector drum; (h) transferring the rib structures from the second mold to the thin transparent glass layer on the collector drum; and (i) transferring the rib structures and thin transparent glass layer from the collector drum to the surface of the glass substrate bearing the electrodes.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
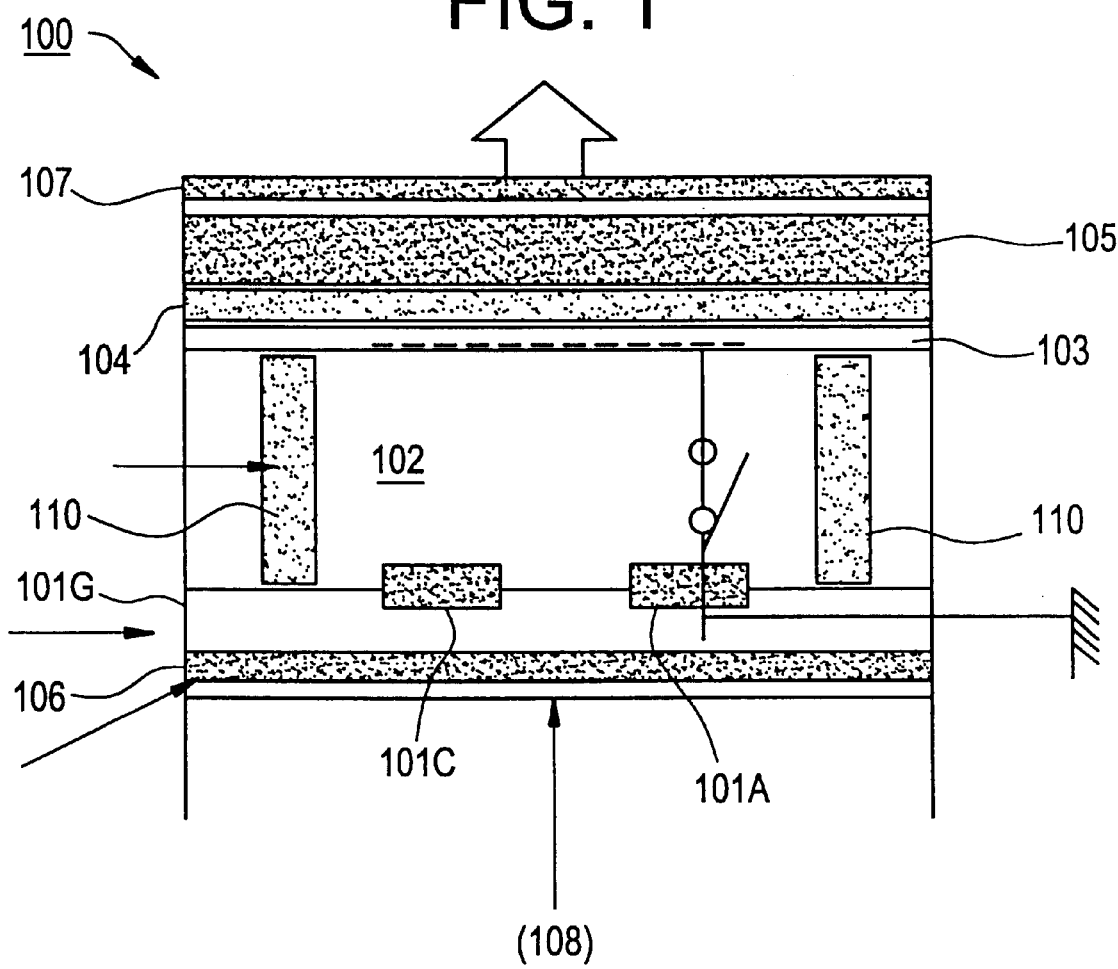
FIG. 1 illustrates a cross-sectional view of a Plasma Addressed Liquid Crystal (PALC) display.

FIG. 1 illustrates a cross-sectional view of a Plasma Addressed Liquid Crystal (PALC) display, which has been briefly discussed in the Background section of this disclosure. A pair of parallel electrodes 101A (anode) and 101C (cathode) is deposited in each channel 102 on a rear glass plate 101G, for example, forming the bottom of the channels, and a very thin dielectric sheet 103, e.g., a glass micro-sheet of about 50 $\mu$m, forms the top of the channels 102. A liquid crystal layer 104 on top of the micro-sheet 103 is the optically active portion of the display 100. A cover sheet 105, e.g., a passive glass plate of about 1.1 mm, with transparent conducting electrodes, e.g., made from indium-tin oxide (ITO), running perpendicular to the plasma channels 102, lies on top of the liquid crystal 104. Conventional polarizers 106, color filters 107, and back lights 108, like those found in other conventional liquid crystal displays, are also commonly used, as illustrated. Opaque ribs 110 separate the channels 102.

FIGS. 2A to 2K illustrate method steps according to an exemplary embodiment of the invention, in particular, a method of manufacturing a complete PALC structure through a continuous manufacturing process. The complete PALC structure may include an optional dielectric barrier layer 202 on a glass substrate 201.

In this exemplary method, the formation of the plasma channel structure, with or without an optional glass frit dielectric barrier layer 202 on the glass substrate 201, may be achieved in a continuous process. For this exemplary method, the materials used may include: electrode materials made of, for example, a metallic powder dispersed in a curable organic medium (e.g., silver powder dispersed in a thermoplastic wax medium); dielectric glass frit materials made of, for example, a glass powder dispersed in a curable organic medium (e.g., a thermoplastic wax medium) which materials are transparent; and rib materials made of, for example, a glass powder dispersed in a curable organic medium (e.g., a thermoplastic wax medium), which can be made opaque by the inclusion of opaque pigments. Useful curable media should be micromoldable and easily removed by burning, and include both thermoplastic and thermosetting materials. However, thermoplastic materials are often generally preferred.

Figure 2A:
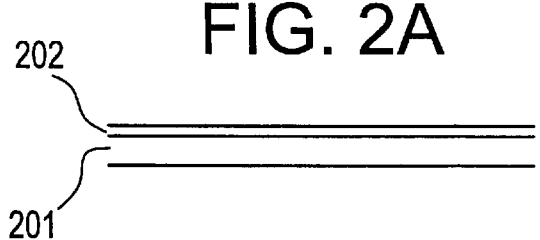
FIGS. 2A to 2K illustrate method steps according to an exemplary embodiment of the invention for preparing PALC displays.

Referring to FIG. 2A, Step 1, depending on the nature of the glass substrate 201 used, an optional dielectric glass paste 202 may be bladed onto a glass substrate 201. The glass paste preferably contains a thermoplastic binder material and can be softened by heating prior to application to the glass substrate. The inclusion of the dielectric layer 202 can help the transfer of the electrodes from the silicone mold to the glass substrate in Step 3, below, but is not required. Additionally, depending on the composition of dielectric layer 202, it can also be used as a barrier layer to avoid diffusion of metal oxides from the electrode materials into the glass substrate, which can potentially make short circuits after long term use of the display.

Figure 2B:
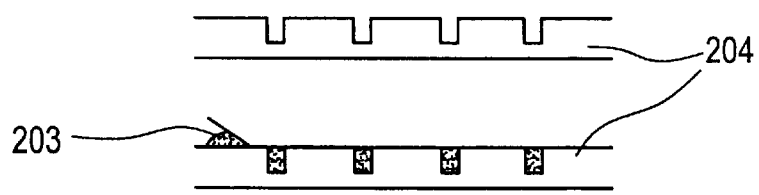

Step 2, shown in FIG. 2B, illustrates blading a silver electrode paste 203 onto an intaglio mold 204. The silver paste 203 will form electrodes at locations which are determined by the arrangement of the cavities or recesses in the mold 204. The silver paste preferably contains a thermoplastic binder and can be softened by heating prior to application to the mold. The mold is preferably formed of a soft material exhibiting suitable release characteristics such as, for example, silicone.

Figure 2C:
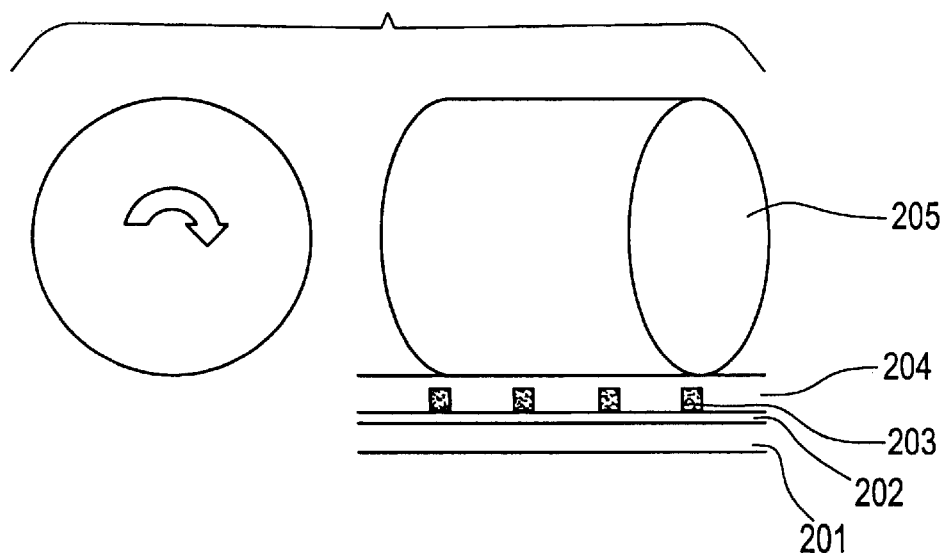
Figure 2D:
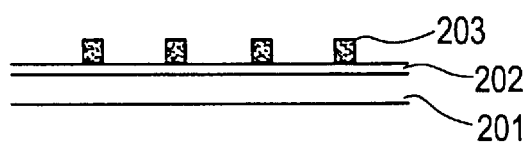

Step 3, illustrated in FIG. 2C, shows a transferring of the silver paste electrodes 203 to the glass substrate 201, with or without barrier dielectric layer 202, by pressing the mold 204, having silver paste electrodes 203 contained within the cavities therein, against the glass substrate 201 with a transfer roll 205 such that the electrodes 203 contact the glass substrate 201 and adhere thereto, upon cooling the glass substrate 201 and mold 204. Thereafter, in Step 4, illustrated in FIG. 2D, the mold 204 is released and removed at, e.g., room temperature, leaving the electrodes 203 disposed in position on the glass substrate 201, with or without barrier dielectric layer 202.

It should be noted that the above-described process steps 1 to 4 could be replaced by any way of printing electrodes onto a coated or un-coated glass substrate, including a suitable process based on photo-lithography, a screen printing, or by a micro-molding process utilizing an intaglio collector drum or intaglio mold as disclosed in U.S. Pat. application Ser. No. 08/820,206 referred to above, for example, as would be understood by those skilled in the art to be within the spirit and scope of the invention.

Figure 2E:
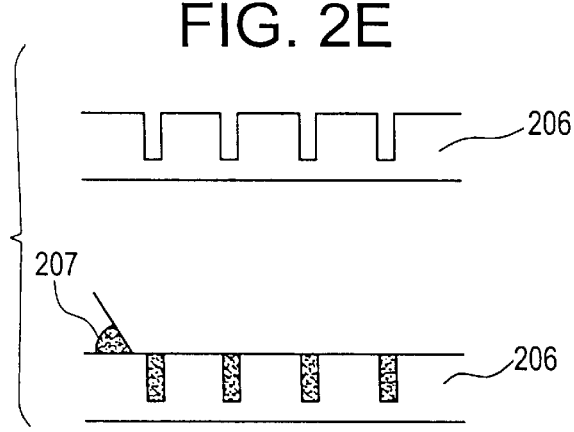
Figure 2F:
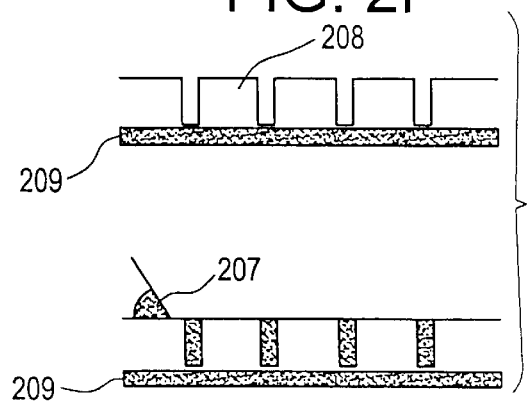

Step 5, illustrated in FIGS. 2E and 2F, shows a first rib forming step which can be accomplished in either of the exemplary illustrated ways. FIG. 2E shows a first alternative in which a dielectric glass paste 207, which can be made opaque according to co-pending application Ser. No. 60/117,158 entitled "Opaque Ribs Structures for Display Panel," filed Jan. 25, 1999, used for the rib structure is bladed into a mold 206, e.g., a soft intaglio mold. FIG. 2F shows a second alternative using a mold 208 disposed on a flat and rigid substrate 209 for a thick screen printing technique. In the second alternative of FIG. 2F, rib paste 207 is "printed" through slots in the mold 208 onto the rigid substrate 209. In both alternatives, the molds can be formed of any material which can be patterned with known techniques and which has acceptable release properties, as would be apparent to one skilled in the art, within the spirit and scope of the invention. Preferably, the molds are formed of silicone.

Accordingly, in the first alternative of Step 5 shown in FIG. 2E, the soft intaglio mold 206 would preferably be made of silicone, and the glass paste 207 would preferably be made opaque by using frit compositions containing opaque pigments. For example, the paste 207 could be made of a glass frit, opaque pigments, and a thermoplastic binder so that the glass paste material can be doctored into the mold at a temperature slightly higher than room temperature, e.g., 50° C. to 100° C.

In the second alternative of Step 5 shown in FIG. 2F, where the process of thick screen printing through a mold 208 onto a rigid substrate 209 is shown, the method is preferably accomplished as a screen printing technique using a thick silicone mold with slots which corresponds to the rib structures. A possible advantage of this method over the intaglio alternative method of FIG. 2E, resides in the fact that the rib structure can be filled through the slots of the thick silicone mold 208 onto a very rigid and flat substrate 209. This insures a practically perfect flatness of the foot of the rib so formed, thereby avoiding negative meniscus shapes which could occur in the soft intaglio method alternative after doctor blading, and achieving a better subsequent transfer onto the glass substrate 201. This second alternative method of FIG. 2F may also be easier to use when one wants to deposit relatively thick, e.g., 50 to 300 microns thick rib structures directly onto the rear glass plate (101G) of the display panel 100.

Figure 2G:
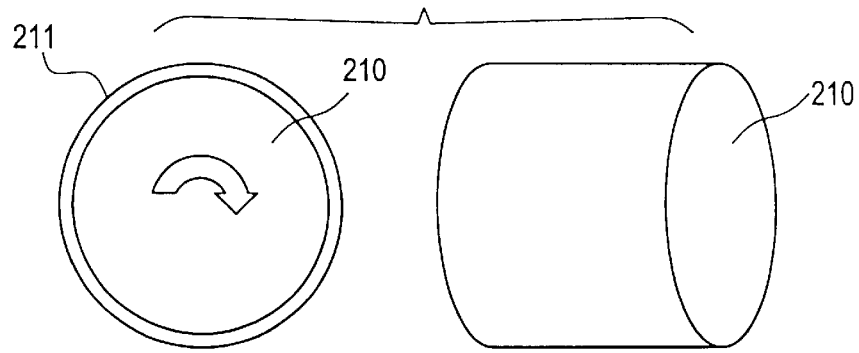

Step 6, illustrated in FIG. 2G includes coating a transfer drum 210 with a thin layer of transparent dielectric glass paste 211 having a typical thickness of from about 15 microns to about 50 microns. The transfer drum is preferably formed of a material exhibiting suitable release characteristics to allow removal of the coating layer without damage, or is coated with a suitable release agent or material such as a polyethylene terephthalate (Mylar) film. Further, the glass paste preferably contains a thermoplastic binder material and the transfer roll is preferably heated to a temperature of from about 40° C. to about 150° C. to facilitate application of the coating and maintain the coating in a tacky state sufficient to cause the ribs to release from the mold and becomes attached thereto upon contact.

Figure 2H:
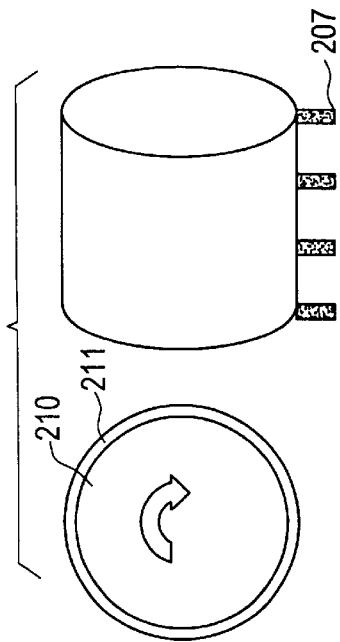
Figure 2I:
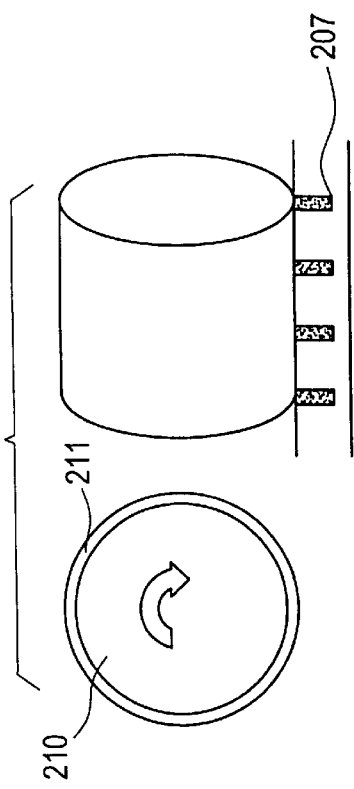
Figure 2J:
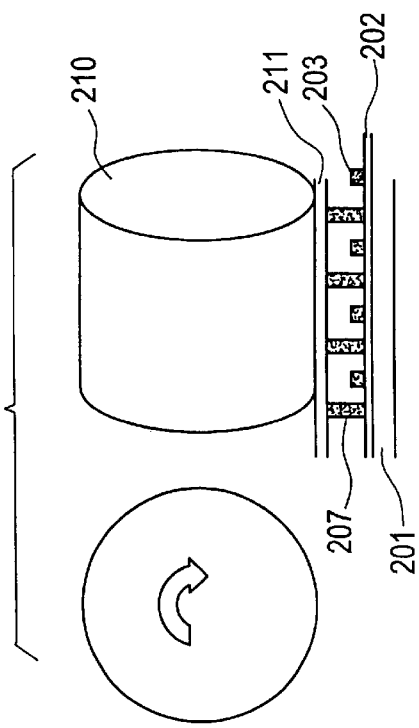

Step 7, shown in FIGS. 2H, 2I, and 2J involves transferring the rib structure 207 from the mold 206 or 208 onto the coated transfer drum 210 by rolling the coated transfer drum over the surface of the mold such that the barrier ribs contained within the mold cavities contact the drum coating and adhere thereto upon cooling. The rib structure 207 would, of course, have been previously allowed to consolidate by heating to a temperature of from about 400° C. to about 600° C. FIG. 2H is the Step 7 alternative which follows from the mold alternative in FIG. 2E, and FIG. 2I is for the Step 7 alternative following from the mold alternative in FIG. 2F. FIG. 2J shows the coated transfer drum 210 with the rib structure 207 having been transferred thereto. The coating of a thin dielectric glass layer 211 contacts the top of the rib structure 207.

Figure 2K:
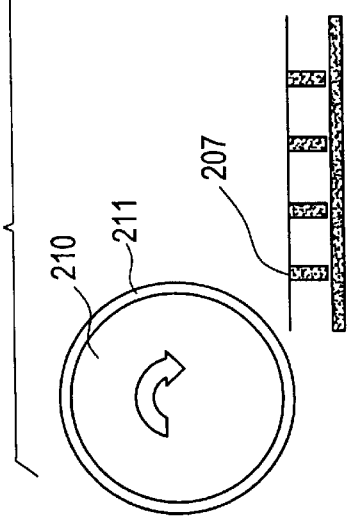

In Step 8, shown in FIG. 2K, the rib structure 207, with the thin dielectric layer 211 on top (from the transfer drum 210), is transferred to the glass substrate 201, with or without the barrier layer 202. The glass substrate. 201 would already contain the electrodes 203 and optionally the barrier layer 202, from the previous process steps described above.

To aid in the transfer onto the glass substrate 201, especially for designs where the electrodes 203 are aligned with the rib structure 207, a thin polymer layer, such as an ethyl cellulose layer (not shown), for example, can be laid down on top of the glass 201 and the electrodes 203, to ensure an easy transfer of the ribs 207. This polymer layer facilitates bonding of the barrier ribs to the substrate by increasing the adhesion therebetween by providing a tacky, sticky surface. This polymer layer would then be eliminated during firing of the whole structure to fuse the glass frit.

Some advantages of the above-described manufacturing process include cost advantages due to avoiding the multiple steps usually required to manufacture rib structures with a high aspect ratio by conventional screen printing and photolithographic processes, and cost advantages due to a transfer of the rib structure onto rear glass with electrodes in one step, including a thin dielectric glass layer which replaces the problematic micro-sheet which is no longer required with this process. This process thus suppresses the need for a large size glass micro-sheet, and allows thickness reduction of this dielectric separator, which will improve performances of PALC display panels. Further, excellent contact between the tops of the ribs and the thin dielectric glass layer is achieved because the contact is obtained by a transfer process. Consequently, polishing of the top of the ribs, used usually in PALC structure manufacturing in order to match the flatness of the glass, is no longer required.

While each of the above micro-molding techniques may be used to form the barrier ribs and transfer them to the dielectric glass coating on the drum, avoiding the deposition of a residual film of the barrier rib material on the dielectric glass layer between the ribs can be difficult. However, in an alternative embodiment of the invention, this problem can be avoided by printing the barrier ribs directly onto the glass substrate through a thick screen as described above, and then applying a thin layer of a dielectric glass on top of the ribs.

Figure 3A:
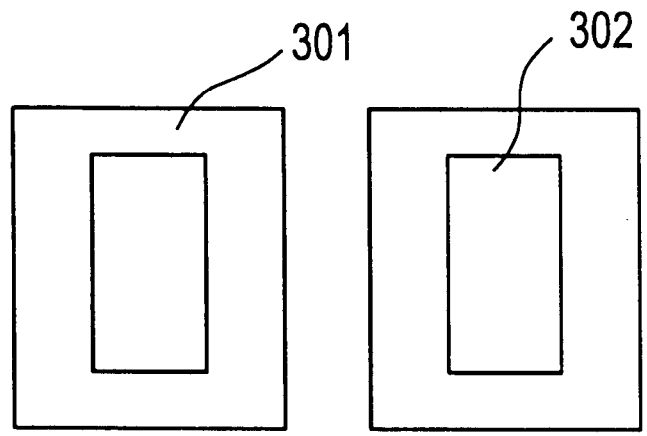
FIGS. 3A and 3B illustrate providing a metal core and adding a bridge structure according to an exemplary embodiment of the invention.
Figure 3B:
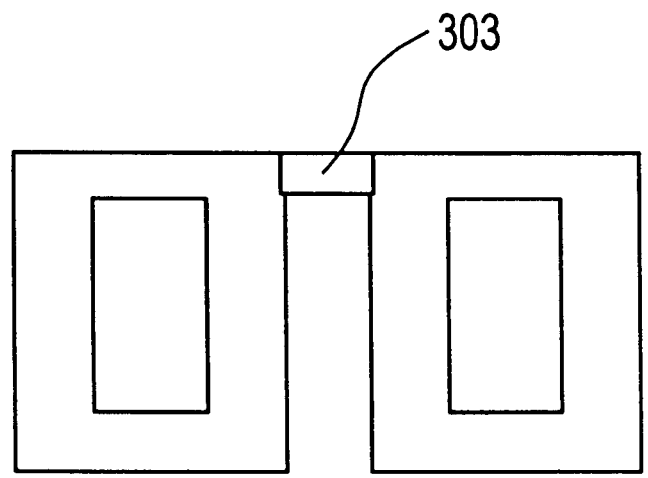

In this method, a thick screen patterned with slots is formed from a film of a material exhibiting suitable release characteristics such as silicone. The film is deposited on the glass substrate and is preferably heated to a temperature of from about 40° C. to about 150° C. The glass frit containing paste for the barrier ribs is then bladed through the slots in the screen onto the glass substrate. After cooling, the patterned screen is removed to leave the barrier rib structure disposed on the glass substrate. To increase the rigidity of such a thick screen 301, and consequently have a better dimensional control over the resulting rib structures, the use of a rigid core structure 302 made of, for example, metal, can be inserted in the patterned screen 301, as shown in FIGS. 3A and 3B. In order to maintain the spacing of the slots, e.g., in the case of long slots required for display applications, thin bridges 303 can be added without obstructing the flow of the glass frit containing paste into the slots during the blading operation. FIG. 3B illustrates such a bridge structure 303 according to an exemplary embodiment of the invention.

A further exemplary method will now be described, which accomplishes the depositing of a dielectric layer of glass onto rib structures projecting from a glass substrate to complete the formation of the plasma channels. The method described in this example demonstrates the basic feasibility of the use of this embodiment in a continuous manufacturing process, while suppressing the need for large size glass micro-sheet in PALC manufacturing.

According to this method, a glass substrate with projecting ribs are first treated to cure/solidify the ribs prior to deposition of the dielectric glass layer. This can be accomplished by baking the substrate at a temperature of from about 400° C. to about 600° C. to fuse the glass frit and remove the organic binder. However, if the paste used to form the ribs contains a UV-curable medium, consolidation using a UV treatment is generally sufficient to provide adequate structural integrity to the ribs to permit transfer of the dielectric glass layer without deformation of the ribs. Thereafter, a layer of a dielectric glass frit containing paste is applied to the tops of the ribs to seal the plasma channels. The dielectric frit containing layer may be deposited onto the ribs by transfer from a suitable release substrate. For example, the glass frit containing material may be coated on a film such as polyethylene terephthalate (Mylar) to a desired thickness, such as from about 15 microns to about 50 microns, and the coating transferred onto the tops of the ribs from the release substrate by contact. Preferably, the glass frit paste contains a thermoplastic binder and is softened by heating to facilitate application to the release substrate and adhesion to the tops of the ribs upon contact. The release substrate could then be removed after cooling.

Figure 4:
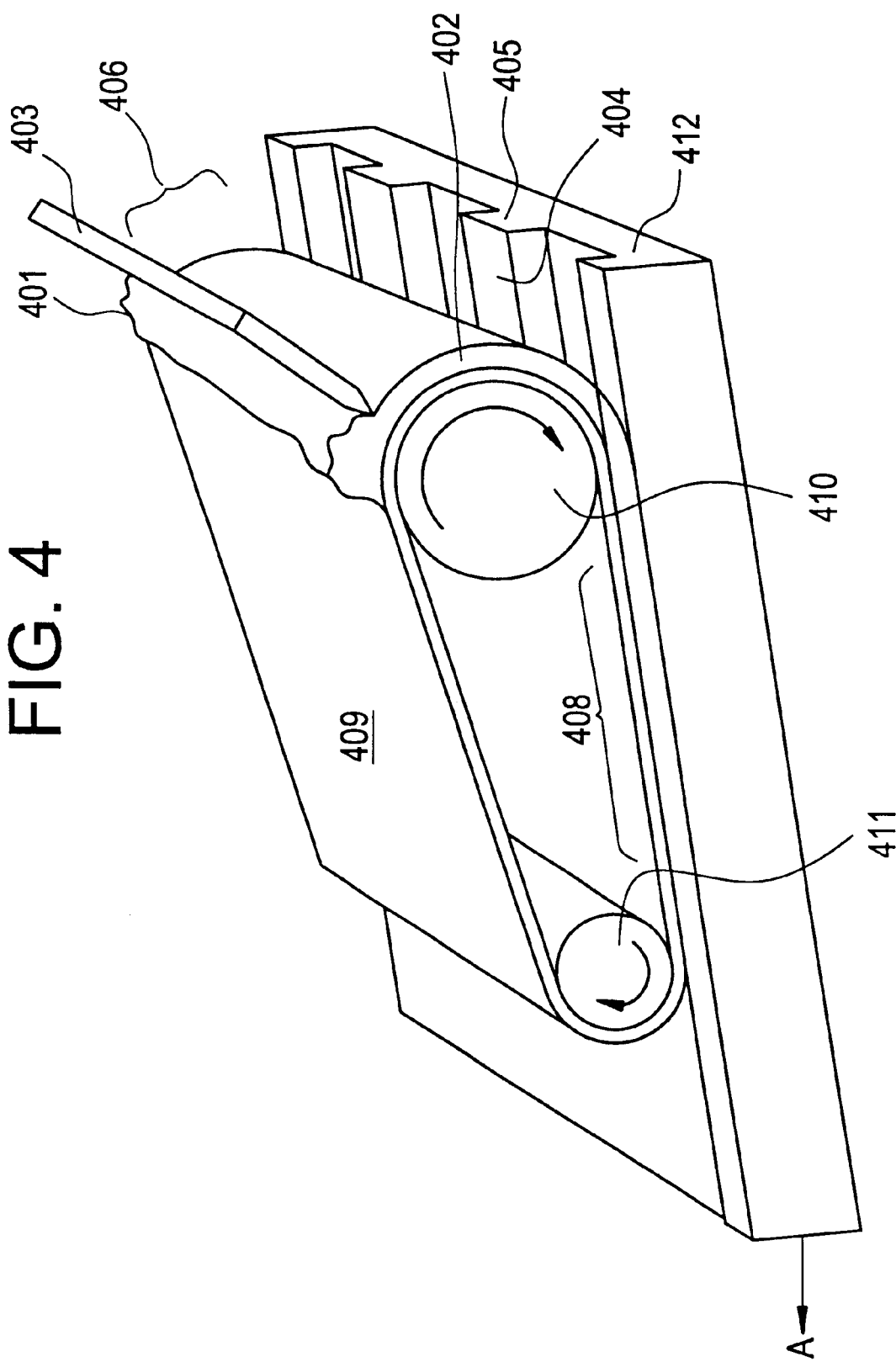
FIG. 4 illustrates an exemplary arrangement for practicing a method according to an exemplary embodiment of the invention.

FIG. 4 schematically illustrates an exemplary arrangement for practicing this method according to the described exemplary embodiment of the invention. In this embodiment, a continuous moving belt 409 comprised of a release substrate on its surface passes through a heating zone 406 to a cooling zone 408, around a transfer drum 410 and idler roll 411. Thermoplastic glass frit paste 401 is applied to the release substrate 409 as it passes around transfer drum 410. The glass frit paste may be applied by any suitable means, but is preferably formed into a layer of desired thickness 402 by a doctor blade 403. Preferably the thickness of layer 402 is from about 15 to about 50 microns. As belt 409 passes around transfer drum 410, the layer of glass frit containing material 402 contacts the tops 404 of barrier ribs 405 projecting outwardly from glass substrate 412 which is moving in the direction A therebelow. As the glass frit layer passes through the cooling zone 408, it solidifies and adheres to the tops of the barrier ribs 404. As the belt passes around idler roll 411, the glass frit containing layer 402 separates from the release surface of belt 409 and is transferred to the rib structure.

It will be apparent to one skilled in the art that the manner of making and using the claimed invention has been adequately disclosed in the above-written description of the preferred embodiments taken together with the drawings.

Further, it will be understood that the above described preferred embodiments of the present invention are susceptible to various modifications, changes, and adaptations, and the same are intended to be comprehended within the meaning and range of equivalents of the appended claims.

For example, although the embodiments of the invention have been described above with exemplary materials, the invention is not limited thereby. Other suitable materials could be used. In particular, although a thermoplastic medium or curable thermosetting medium may have been described in a particular embodiment, another type of hardenable or curable material could be used, such as an ultraviolet sensitive material.

What is claimed is:

1. A method of manufacturing an assembly of rib structures sandwiched between a thin dielectric glass layer and a glass substrate for use in a plasma addressed liquid crystal display, the method comprising:

introducing a curable glass frit containing paste into cavities in a mold to form the rib structures;

forming a thin layer of a dielectric glass frit containing composition on a collector drum;

transferring the rib structures from the mold to the dielectric glass frit containing layer on the collector drum; and transferring the rib structures and thin dielectric glass frit containing layer from the collector drum to the glass substrate.

2. The method according to claim 1, wherein the mold is a soft intaglio mold.

3. The method according to claim 2, wherein the mold comprises silicone.

4. The method according to claim 1, wherein the mold is a film on a rigid substrate, said film having slots formed therein at locations corresponding to the desired barrier ribs.

5. The method according to claim 4, wherein the film comprises silicone.

6. The method according to claim 1, wherein the glass frit containing paste comprises glass frit and a thermoplastic binder.

7. The method according to claim 6, wherein the dielectric glass frit containing composition comprises a dielectric glass frit and a thermoplastic binder.

8. The method according to claim 7, wherein the dielectric glass frit containing layer on the collector drum is heated to a temperature of from about 40° C. to about 150° C.

9. The method of claim 8, wherein said step of transferring said ribs onto said dielectric glass frit containing layer comprises pressing said mold against said heated dielectric glass frit containing layer on said collector drum such that said rib structures contact said dielectric glass frit containing layer, cooling said dielectric glass frit-containing layer while in contact with said barrier rib structures, and removing said mold.

10. The method according to claim 1, wherein the thin dielectric glass frit containing layer is from about 15 $\mu$m to about 50 $\mu$m in thickness.

11. The method according to claim 6, wherein said rib structures and dielectric glass frit containing layer are transferred from said collector roll to said substrate by contacting said rib structures to said substrate.

12. The method according to claim 11, wherein said substrate is heated to a temperature of from about 40° C. to about 150° C. prior to contacting said rib structures.

13. The method according to claim 1, wherein the forming of a thin layer of a dielectric glass frit containing composition on the collector drum comprises providing a transparent dielectric glass paste onto a polymer film on the collector drum.

* * * * *